July 7, 1925.  
W. F. HILLPOT  
INCUBATOR  
Original Filed July 26, 1922   5 Sheets-Sheet 1
1,545,425
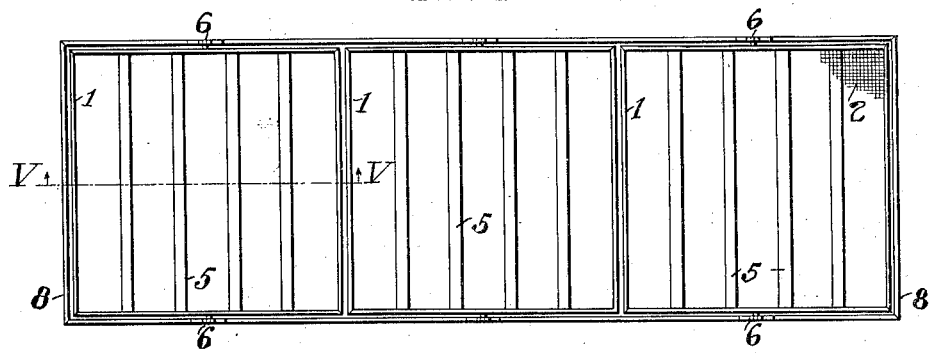
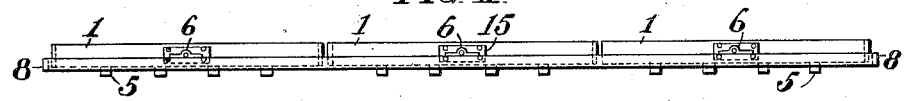
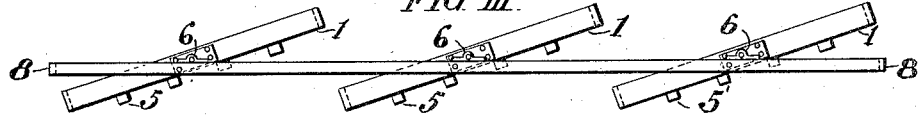
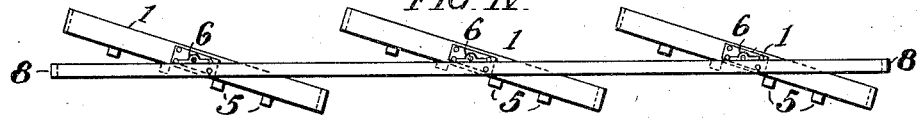
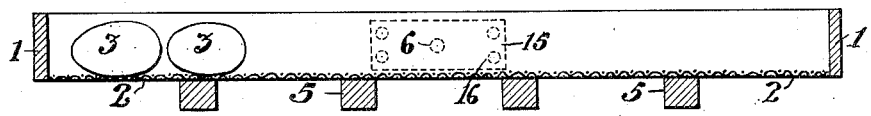
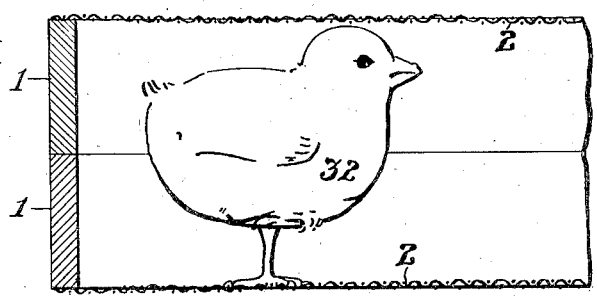
Inventor:  
WILLIAM F. HILLPOT,

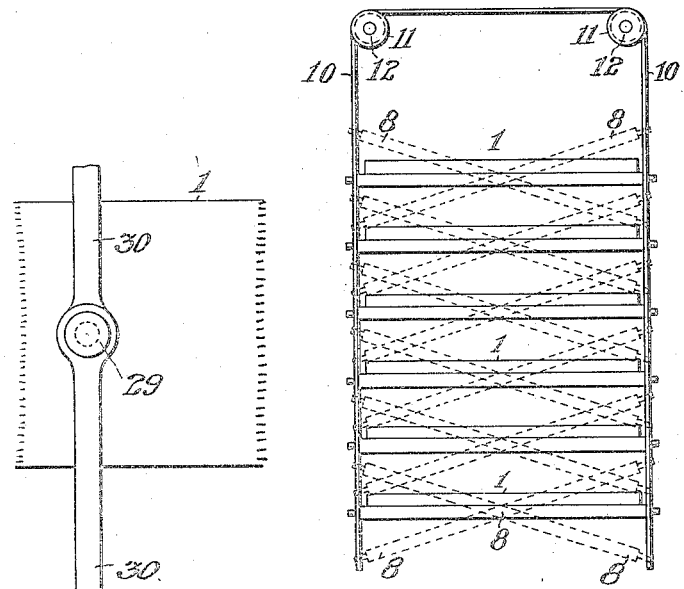
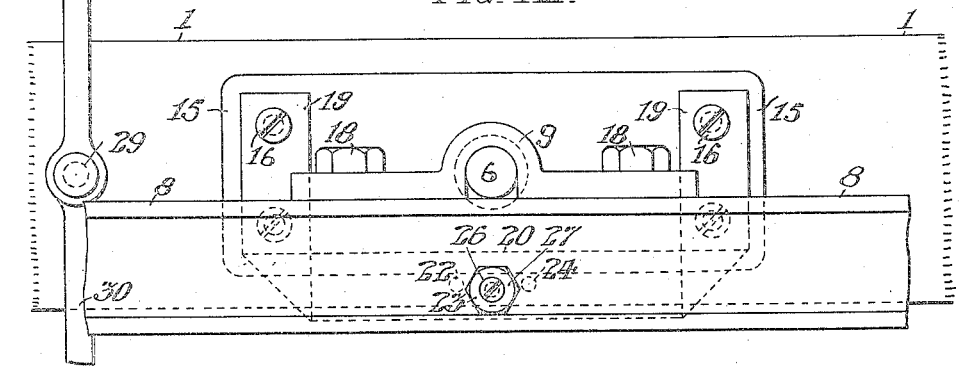
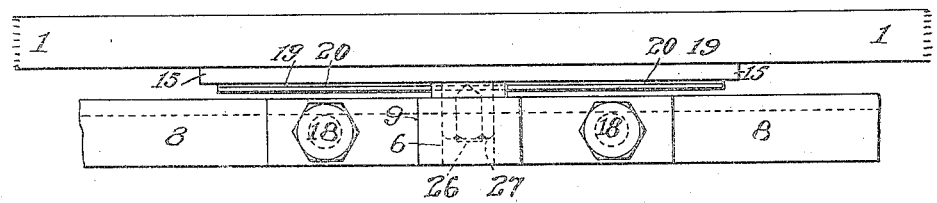

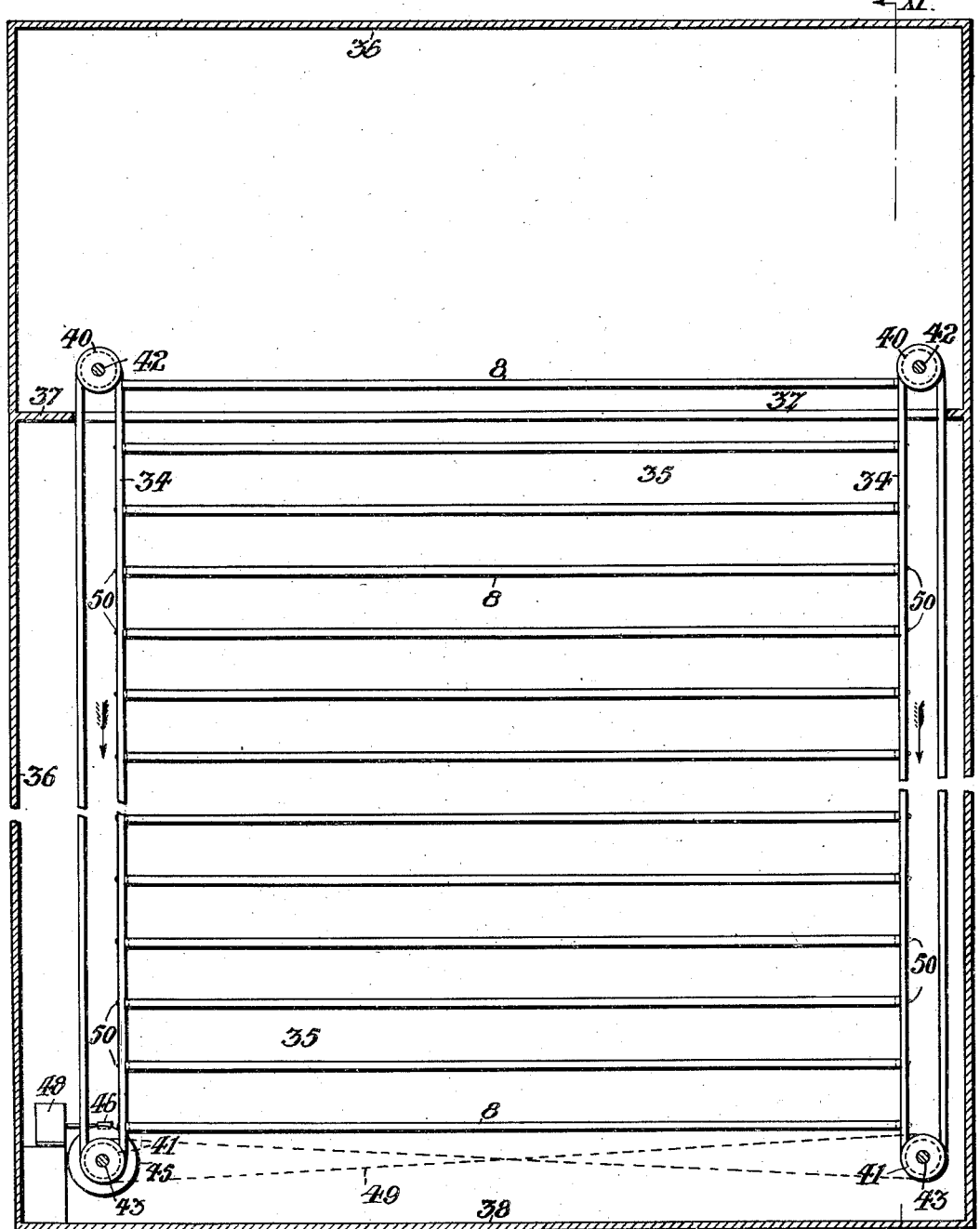

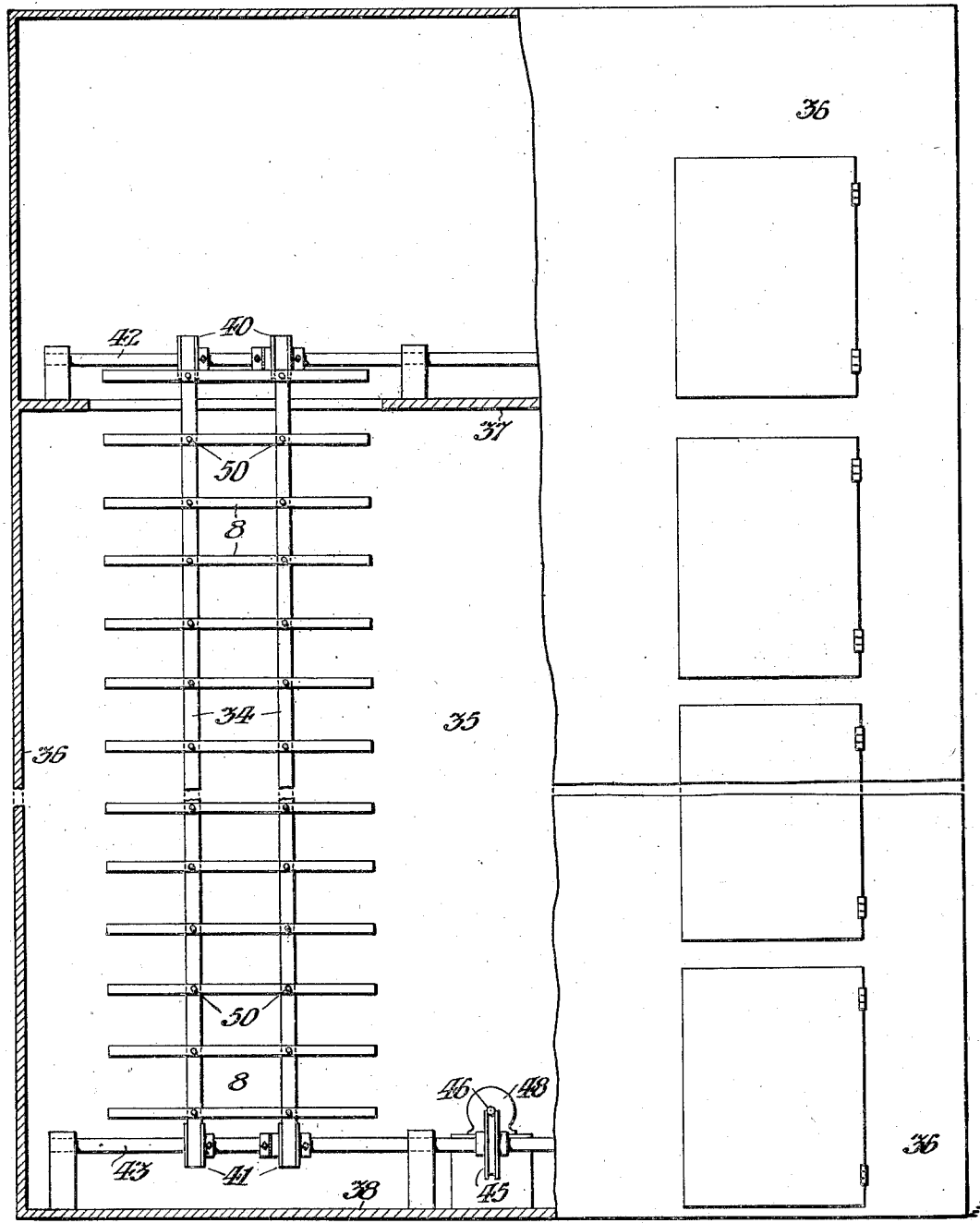

July 7, 1925.
W. F. HILLPOT
INCUBATOR
Original Filed July 26, 1922    5 Sheets-Sheet 5
1,545,425
FIG. XII.
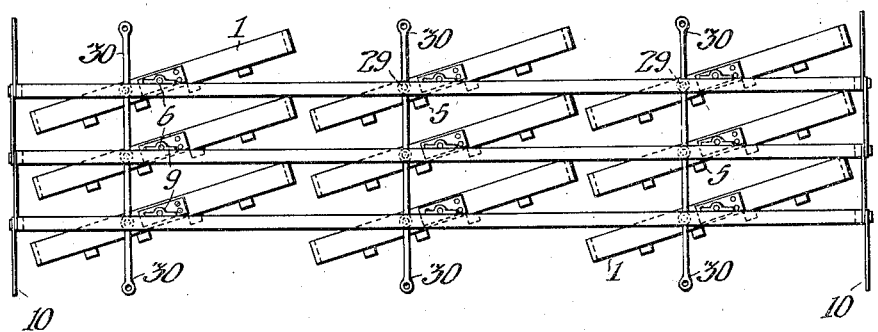
FIG. XIII.
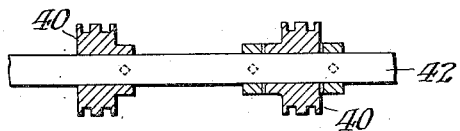
FIG. XIV.
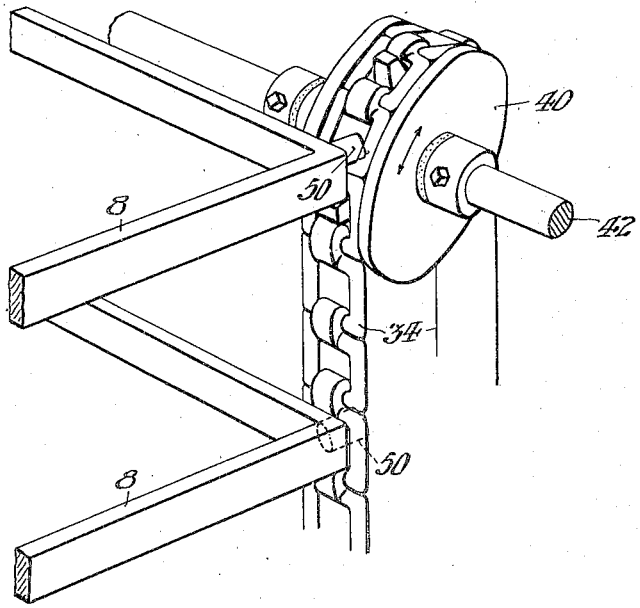
Inventor:
WILLIAM FINNEY HILLPOT, Patented July 7, 1925.

1,545,425

UNITED STATES PATENT OFFICE.

WILLIAM FINNEY HILLPOT, OF FRENCHTOWN, NEW JERSEY.

INCUBATOR.

Original application filed July 26, 1922, Serial No. 577,499. Divided and this application filed August 27, 1923. Serial No. 659,429.

*To all whom it may concern:*

Be it known that I, WILLIAM FINNEY HILLPOT, a citizen of the United States, residing at Frenchtown, in the county of Hunterdon and State of New Jersey, have invented a certain new and useful Improvement in Incubators, whereof the following is a specification, reference being had to the accompanying drawings.

It is the object of my invention to provide means for supporting eggs, during the period of incubation thereof, in such manner that the eggs may be repeatedly turned, at intervals, in simulation of the turning movements naturally imparted to such eggs by the mother birds, and in such environment as to afford the desired degree of warmth during such period, while maintaining the eggs in such relation to each other that they may be individually inspected at any time.

A characteristic feature of my invention is that each egg is so supported that it may be tilted in two vertical planes, at right angles to each other, so that even without changing the position of the eggs with respect to the supporting element with which they are in direct contact, each egg may be disposed, in succession, in four different positions of rotation with respect to the earth.

As hereinafter described, I find it convenient to provide supporting means of the character above contemplated, including trays which are square frames open at the top but covered at the bottom with foraminous material, such as insect wire screening; each of said trays having opposite axially alined trunnions intermediate of its width, coinciding with its horizontal axis of oscillation; so that each such tray may be oscillated in a vertical plane. Moreover, I find it convenient to mount a series of such trays, with their respective axes of oscillation parallel with each other, in a holder which is a rectangular, parallelogram frame, having bearings at its opposite longitudinal sides, for the respective trunnions of said series of trays, and having means supporting said frame so that it may be tilted upon a horizontal axis of oscillation, in transverse relation to the axes of oscillation of the trays which it supports. Such holder supporting means preferably includes flexible connectors to which said holder frames are attached so as to be suspended by such connectors. As hereinafter described, such connectors may be chains extending over sheaves having horizontal axes of rotation, so that when one longitudinal edge of such a holder is raised, the opposite edge is correspondingly depressed; so as to thus incline the series of trays supported by said holder. The construction and arrangement above contemplated are such, that the freedom of movements of said trays and holders are such that the trays may be tilted in either direction, upon their individual axes, regardless of the position in which such tray axes are held by the holder, and, the holders may be tilted, in either direction, regardless of the position in which the trays which they hold are tilted; so that each tray may be disposed in several different positions with respect to the earth, as above contemplated, and with the object and effect of preventing the embryos from sticking to the shells. For instance, each tray may be tilted, upon its axis, to and from horizontal position, and inclined in either of two opposite directions; and the holder for such a series of trays may be tilted to and from horizontal position, and inclined in either of two opposite directions, and the latter directions may be transverse to the directions of tilt of said trays.

As hereinafter described, such trays may be thus supported within any suitable housing adapted to more or less confine an atmosphere which may be conveniently heated to the proper degree for incubation of the eggs under treatment.

My invention includes the various novel features of construction, arrangement and procedure hereinafter more definitely specified.

In said drawings; Fig. I is a plan view of a convenient embodiment of my invention, including a series of three egg trays mounted in an oblong holder frame, hereinafter termed a rack.

Fig. II is a front edge elevation of the structure shown in Fig. I; with said trays and holder frame in horizontal position.

Fig. III is a front edge view of said structure, similar to Fig. II, but with the egg trays respectively tilted to the same degree of inclination in one direction.

Fig. IV is a front edge view of said structure, similar to Fig. II, but with the egg trays respectively tilted to the same degree of inclination, in the opposite direction to their position in Fig. III.

Fig. V is a transverse sectional view of one of said egg trays, taken on the line V, V, in Fig. I, but on a larger scale.

Fig. VI is a fragmentary sectional view of the left-hand end of the egg tray shown in Fig. V, but on a larger scale, and with a similar egg tray inverted over it to form an inclosure for the hatched chicks.

Fig. VII is a fragmentary end elevation of a vertical series of egg trays and their respective holders, such as shown in Figs. I and II, with convenient means for oscillating the holder frames, arranged to tilt the axes of oscillation of the individual egg trays; whereby said trays are arranged to be tilted in altitudinal planes which are in transverse relation to each other.

Fig. VIII is a fragmentary edge elevation of the structure shown in Fig. II, but on a larger scale, showing details of construction and arrangement of means for temporarily detaining the respective trays in their different positions of inclination.

Fig. IX is a plan view of the fragmentary structure shown in Fig. VIII.

Fig. X is a diagrammatic elevation of an embodiment of my invention, wherein a series of such egg trays and holders may be successively progressed, vertically, by endless chain conveyors, in an inclosure heated to different temperatures at different regions, adapted for the best incubating effect.

Fig. XI is a diagrammatic, partly sectional, elevation of the structure shown in Fig. X, taken on the line XI, XI in Fig. X.

Fig. XII is a front edge view of a series of the structure shown in Fig. III, connected in multiple operative relation.

Fig. XIII is a fragmentary, partly sectional, view of the upper shaft shown in Fig. X, with sprocket wheels respectively rigidly and frictionally held on said shaft.

Fig. XIV is a fragmentary perspective view showing the construction and arrangement whereby the holder racks are automatically engaged and disengaged at the top and bottom bights of the chains where they extend around the sprocket wheels in Fig. X.

In said figures; the egg trays each comprise a rectangular, and conveniently square, marginal frame 1, which is open at the top, and covered at the bottom with a web 2, preferably of foraminous material adapted to support the eggs 3 while permitting free circulation of air around them. Such a web is conveniently formed of insect screen wire, and is preferably reinforced and supported at intervals by the cross bars 5 which are rigidly connected at their opposite ends with the opposite side walls of said frame 1.

Each of said trays 1 is provided with trunnions 6, axially alined at the middle of each tray and projecting from opposite sides thereof, coincident with the axis of oscillation of the tray. Means supporting said trays with their trunnions, extending horizontally for altitudinal tilting movement, i. e., tilting movement whereby their angular height may be varied, in a vertical plane, include a holder comprising a rectangular parallelogram frame 8, which, as indicated in Figs. VIII and IX is conveniently formed of channel iron. Each of said holder frames 8 has bearings 9 at its opposite longitudinal sides, for the respective trunnions 6 of said trays; the arrangement being such that the axes of oscillation of said trays, coincident with their respective trunnions 6, are parallel with each other, as indicated in Fig. I.

Each of said holder frames has means supporting it so that it may be tilted upon a horizontal axis of oscillation, in transverse relation to the axis of oscillation of the trays which it supports. For instance, as indicated in Fig. VII; each rack or holder frame 8 is suspended upon a flexible connector 10, conveniently a chain, extending over sheaves 11, which are mounted to rotate upon shafts 12, parallel with each other. It is to be understood that the arrangement shown in Fig. VII is such that when one longitudinal edge of any holder 8 is raised, the opposite edge thereof is correspondingly depressed; so that said holder rack frames may be held in horizontal position, as indicated in full lines in said figure, or tilted so as to be inclined in either of two opposite directions, as indicated in dotted lines.

In other words; the construction and arrangement above described are such that the freedom of movement of said trays and holders permit each tray 1 to be tilted, so as to be inclined in either of two opposite directions, upon its individual axis, coincident with its trunnions 6, regardless of the position in which such axis is held by its holder 8, and said holder may be tilted, so as to be inclined in either of two opposite directions, regardless of the position in which the tray is tilted upon its individual axis aforesaid; so that each tray may be inclined in at least four different positions with respect to the earth.

I find it convenient to form said tray frames 1 of wood, and to provide each of their trunnions 6 with a base plate 15 having holes to receive wood screws 16 by which it may be rigidly connected with such frames. Said bearings 9 for the trunnions 6 have holes to receive machine screws 18 by which they are rigidly connected with the metal holder frames 8, in the positions shown in Figs. I to IV inclusive. I also find it convenient to provide detent means, to detain each tray in its position of adjustment, so as to prevent accidental displacement thereof until it is desired to change its position, as above contemplated, and such means may conveniently include strips of spring metal 19 which are bent to U-shape, as indicated in Figs. VIII and IX, and have holes in their opposite ends which register with the holes in said trunnion base plates 15, so as to be engaged by said screws 16, and resiliently present the bight 20 of each strip in position to selectively engage, in any one of the three recesses 22, 23 or 24, the tapered inner end of a detent screw 26, which is in threaded engagement with the respective holder frame 8 and held in proper position therein by a jam nut 27. It may be observed that said recesses 22, 23 and 24 respectively correspond with the three positions in the range of tilting movement of the trays, indicated in the drawings.

Although each tray may be thus independently adjusted and retained in any selected position of inclination; I find it desirable to operatively connect such trays in vertical series, so that any desired number of them may be tilted by one movement which is sufficient to tilt any one of them. Such means may include screw studs 29 respectively attached to the tray frames 1 and fitted to engage holes in links 30, which I have indicated in Fig. VIII as formed of stamped sheet metal, but which may be formed of wire, as indicated in Fig. XII, or any other suitable material.

Each of the eggs 3 may thus be inclined, mechanically, in simulation of the movements naturally imparted to an incubating egg, by the mother bird, with the effect that the embryos are prevented from adhering to the lining membrane of the egg shells, as they do when the eggs are allowed to remain stationary. Moreover, such repeated movements of the eggs have a stimulating effect upon the development of the embryos so that more of the latter survive than is the case when the eggs are allowed to remain stationary.

As indicated in Fig. VI; said egg frame trays 1 may be used as coops for the hatched chicks 32, by inverting one tray over another. For instance, a vertical series of such trays may be loaded with eggs at such intervals that the operator can predetermine which tray contains the eggs which have reached the hatching stage and invert another tray over that particular tray; so as to prevent the escape of the hatched chicks 32.

In order to facilitate such operation of my invention as last above contemplated; I find it convenient to not only arrange the egg trays and their holders in vertical series, as indicated in Fig. VII, but to so support such series that the trays may be progressed through an atmosphere, the temperature of which may be controlled to such a degree as to afford the maximum efficiency of hatching effect. It is generally understood that it is desirable to have the eggs in an atmosphere which is warmer at the beginning of the incubating period than at the end thereof, and my invention may be embodied in any suitable structure adapted for attaining that result. For instance, as indicated in Fig. X, such a vertical series of egg trays and rack frames may be detachably connected with and supported by endless chain belts 34 within a chamber 35 in which the temperature may be controlled by any suitable means. As indicated; said chamber is inclosed by the housing 36 including a platform or floor 37 at the upper level, where it is desired to charge the trays 1 with fresh eggs, and said trays 1 are caused to gradually descend, by movement of said chains 34, through said chamber 35, during the period of incubation, so that when the eggs reach the hatching stage, they are in the lowermost trays in the series, and accessible from the lower platform or floor 38. Such an arrangement permits the trays and holder frames to be manually removed from the bottom of the vertical series aforesaid and recharged with fresh eggs, in succession; so that the incubating process is practically continuous. Of course, in such a structure, the atmosphere in the chamber 35 can be maintained at any suitable temperature in every part, by any suitable means. It may be observed that even if source of heat is at the bottom of said chamber, the natural convection currents are such as to cause the upper portion of the chamber 35 to be warmest, unless a fan or other suitable means are provided for counteracting such natural temperature conditions.

Although all of the movements of the egg trays and their holder frames above described may be effected manually; I find it convenient to effect such movements automatically. For instance, said chain belts 34 extend around sprocket wheels 40 and 41 which are respectively mounted upon shafts 42 and 43, at the top and bottom of said chamber 35, and said chains may be progressed by providing one shaft 43 with a worm gear 45 engaged by a worm 46 driven by a small electric motor 48, and operatively connecting that shaft with the other shaft 43, by any suitable means, for instance, a crossed belt or a transversely extending shaft having bevel gear connections with said shafts 43. Such a belt is indicated by the dotted line in Fig. X. In that arrangement; the rack frames 8 have studs 50 which extend through the links of said chain belts 34, in such relation thereto that they are automatically engaged and disengaged respectively at the top and bottom bights of said chains where they extend around said sprocket wheels. In the arrangement last described, the sprocket wheels upon one side of the frames 8 may be rigidly connected with their respective shafts, whereas, the sprocket wheels upon the other side of said holder frames 8 may be frictionally engaged with their respective shafts, so that the chains 34 upon one side of said holder frames 8 may be shifted relatively to the chains 34 upon the opposite side of said holder frames 8, to effect the tilting movements of said holders, as above described. I find it convenient to effect such tilting movements so as to change the position of the eggs at intervals of six hours, although, of course, such changes may be effected at any desired intervals.

Although, for the reasons stated above, it is convenient to employ my invention with the egg trays and their holders arranged in vertical series; of course, they may be otherwise arranged. Therefore, I do not desire to limit myself to the precise details of construction and arrangement herein set forth, as it is obvious that various modifications may be made therein without departing from the essential features of my invention, as defined in the appended claims.

This is a division of my original application Serial No. 577,499 pursuant to which Letters Patent of the United States No. 1,489,597 were granted to me April 8, 1924 which includes claims describing the generic and specific construction and arrangement exemplified in Figs. I to IX inclusive in this case.

I claim:

1. In an incubator; the combination with a series of egg trays; of means arranged to support said trays with freedom of oscillatory movement in planes in transverse relation to each other; whereby the position of each egg may be changed at intervals; movable means supporting said trays, whereby they may be progressed during the incubating operation thereof; and means arranged to control the temperature of the atmosphere through which said trays are progressed; whereby, said trays and the incubating eggs therein may be successively subjected to different temperatures, most effective for the incubating operation, at different stages thereof; such progressing means including endless flexible connectors and means for shifting them.

2. In an incubator; the combination with a series of egg trays; of means arranged to support said trays with freedom of oscillatory movement in planes in transverse relations to each other; whereby the position of each egg may be changed at intervals; movable means supporting said trays, whereby they may be progressed, during the incubating operation thereof; and means arranged to control the temperature of the atmosphere through which said trays are progressed; whereby, said trays and the incubating eggs therein may be successively subjected to different temperatures, most effective for the incubating operation, at different stages thereof.

3. In an incubator; the combination with a series of egg trays; of means arranged to support said trays with freedom of oscillatory movement in planes in transverse relation to each other; whereby the position of each egg may be changed at intervals; movable means supporting said trays, whereby they may be progressed, during the incubating operation thereof; and means including an electric motor, arranged to automatically move said supporting means; whereby, said trays and the incubating eggs therein may be successively subjected to different temperatures, most effective for the incubating operation, at different stages thereof, and are progressed from a region of introduction of eggs to a region of discharge of chicks; such supporting means including endless belts.

4. In an incubator; the combination with parallel endless chain belts; of a rack having means to support eggs and means arranged to detachably engage said belts, including projecting studs adapted to enter the links of said belts, in such relation thereto that they are automatically engaged and disengaged respectively at the opposite end bights of said belts; whereby, said rack and the incubating eggs supported thereby are progressed from a region of introduction of eggs to a region of discharge of chicks; said belts being arranged to progress a series of such racks in succession at such rate that the egg contents of successive racks are hatched in succession as they reach said region of discharge of chicks and said racks are automatically released from said belts at that region.

5. In an incubator; the combination with parallel endless belts; of a rack having means to support eggs and means arranged to detachably engage said belts, at the end bights of the latter and automatically disengage said belts at the opposite end bights thereof; whereby said rack and the incubating eggs supported thereby are progressed from a region of introduction of eggs to a region of discharge of chicks; said belts being arranged to progress a series of such racks in succession at such rate that the egg contents of successive racks are hatched in succession as they reach said region of discharge of chicks and said racks are automatically released from said belts at that region.

6. In an incubator; the combination with four parallel endless belts; of a rack having means to support eggs and means arranged to detachably engage said belts, in pairs at respectively opposite ends of said rack; wheels supporting said belts; shafts for said wheels; means rigidly connecting the wheels for one belt, of each pair with their shafts; means frictionally connecting the wheels of the other belt, of each pair with their shafts; whereby, said rack may be progressed by simultaneous rotation of said wheels and may be tilted by differential movement of the wheels which are merely frictionally engaged with their shafts; so that said rack may be progressed by said belts in horizontal position, and in positions of inclination in different directions, with consequent changes in position of the eggs carried thereby.

7. In an incubator; the combination with endless belts; of a rack having means to support eggs and means arranged to detachably engage said belts; wheels supporting said belts; shafts for said wheels; whereby, said rack may be progressed by simultaneous movement of said belts and may be tilted by differential movement of said belts; so that said rack may be progressed by said belts in horizontal position, and in positions of inclination in different directions, with consequent changes in position of the eggs carried thereby.

8. In an incubator; the combination with parallel belts; of a rack having means to support eggs and means arranged to engage said belts; whereby, said rack may be progressed by simultaneous movement of said belts and may be tilted by differential movement of said belts; so that said rack may be progressed by said belts in horizontal position, and in positions of inclination in different directions, with consequent changes in position of the eggs carried thereby.

9. In an incubator; the combination with parallel endless chain belts; of a rack having means to support eggs and means arranged to detachably engage said belts; whereby, said rack may be tilted by differential movement of said belts; so that said rack may be shifted to positions of inclination in different directions, with consequent changes in position of the the eggs carried thereby, and may be shifted by said belts from a region of charge to a region of discharge.

In testimony whereof, I have hereunto signed my name at Philadelphia, Pennsylvania, this seventeenth day of August, 1923.

WILLIAM FINNEY HILLPOT.

Witnesses:
ARTHUR E. PAIGE,
CAROLINE E. REUTER.